United States Patent [19]

Johnson et al.

[11] Patent Number: 5,710,225
[45] Date of Patent: Jan. 20, 1998

[54] HETEROPOLYACID CATALYZED POLYMERIZATION OF OLEFINS

[75] Inventors: John R. Johnson, Euclid; James D. Burrington, Mayfield, both of Ohio

[73] Assignee: The Lubrizol Corporation, Wickliffe, Ohio

[21] Appl. No.: 701,937

[22] Filed: Aug. 23, 1996

[51] Int. Cl.⁶ .............................. C08F 4/22; C08F 110/10
[52] U.S. Cl. .............. 526/172; 526/348.7; 585/510; 585/527; 585/530
[58] Field of Search ............... 526/172, 348.7, 526/130; 585/417, 530, 510, 511, 527

[56] References Cited

U.S. PATENT DOCUMENTS

| | | | |
|---|---|---|---|
| 2,237,460 | 4/1941 | Thompson | 196/10 |
| 2,301,966 | 11/1942 | Michel et al. | 260/683 |
| 2,634,260 | 4/1953 | Carnahan | 526/172 X |
| 2,798,890 | 7/1957 | Waterman et al. | 585/417 |
| 2,825,704 | 3/1958 | Arnold et al. | 260/2 |
| 2,851,451 | 9/1958 | Foster et al. | 526/172 X |
| 2,982,799 | 5/1961 | Klinkenberg | 260/683.15 |
| 3,374,285 | 3/1968 | Henke et al. | 585/530 X |
| 5,191,044 | 3/1993 | Rath et al. | 526/348.7 X |
| 5,254,649 | 10/1993 | Miln et al. | 526/348.7 X |

FOREIGN PATENT DOCUMENTS 6173497  7/1994  Japan.

OTHER PUBLICATIONS

Hackh's Chem. Dictionary, 4th ed., McGraw–Hill, N.Y., 472 (1969).

*Primary Examiner*—Fred Teskin
*Attorney, Agent, or Firm*—William J. Connors

[57] ABSTRACT

Phosphotungstic acid salts are used to polymerize $C_2$–$C_{30}$ α-olefins and derivatives thereof to form highly reactive products having a high content of terminal vinylidene groups and β-isomers in resonance therewith. Isobutylene has been polymerized to form a $\overline{Mn}$ 300–20,000 polymer.

10 Claims, No Drawings

HETEROPOLYACID CATALYZED POLYMERIZATION OF OLEFINS

BACKGROUND OF THE INVENTION

It is well known to polymerize olefins using boron trifluoride ($BF_3$). The polymers so produced are highly reactive due to a large percentage of their terminal groups having vinylidene structure. The reactivity of polyolefins has been related to double bond content and the location thereof in the polymer.

U.S. Pat. No. 4,152,499 to BASF describes the synthesis of polyisobutylene polymers (PIB) having a degree of polymerization of 10 to 100 units. The PIB was then reacted with malic anhydride in yields of 60–90% of the theoretical. One hundred percent yield reactions would correspond to a PIB having all vinylidene or α-olefin, ($>C=CH_2$) end units.

U.S. Pat. No. 4,605,808 to BP describes a polyisobutylene having at least 70% unsaturation in the terminal position. As with the '499 patent above, $BF_3$ was used as the cationic polymerization catalyst.

The thrust of the '499 patent was to produce a highly reactive polyisobutylene having a high terminal vinylidene content so that reactions with maleic anhydride would proceed in high yield under mild conditions and without the use of chlorine catalysts. The adducts from the polyisobutylene/maleic anhydride were then reacted with polyamines to form ashless dispersants useful in the oil additive business.

European patent application publication number 0 355 895 by Shell International describes the preparation of succinic anhydride derivatives in the form of polyolefin substituted succinic anhydrides. The use of the substituted anhydrides is in further reactions with other materials to form additives having use in blending lubricating oils.

The thrust of the references above is the use of highly reactive polyolefins in a thermal route rather than a chlorine catalyzed route to the form substituted anhydrides. The thermal route avoids products containing chlorine. The reactivity of the polyolefin was related to the end group in the polymer with terminal olefins (terminal vinylidene) and terminal groups capable of being isomerized thereto being identified as the reactive species. The groups capable of being isomerized to the terminal vinylidene (I) group are the β-isomers (II) of Table 1.

Conventional polyolefin synthesis involves Friedel-Crafts type catalysts reacting with terminal olefins such as isobutene or mixtures of compounds such as a $C_4$ raffinate from a cat cracker or an ethylene plant butane/butene stream. The polyolefins so synthesized are not noted for having high terminal vinylidene contents and are thus not the reagents of choice to use the thermal route to forming polyolefin substituted succinic anhydrides. Conventional PIB when used in thermal condensation procedures with maleic anhydride give low yields and high tar contents and low succination ratios. The thermal route to substituted succinic anhydrides using highly reactive PIB's has been discussed in detail in U.S. Pat. Nos. 5,071,919, 5,137,978, 5,137,980 and 5,241,003, all issued to Ethyl Petroleum Additives, Inc.

The isomer content of a conventional ($AlCl_3$) and high terminal vinylidene PIB's are shown in Table 1. Conventional PIB has terminal vinylidene content of roughly 5%. The terminal isomer groups of conventional PIB and high vinylidene PIB are given below in Table 1 and those published in EPO 0355 895. However, in this invention intermediate vinylidene content PIBs may also be formed. Such intermediate PIBs have a vinylidene content of less than 45% and can range down to the 4–5% vinylidene content of conventional PIBs.

TABLE 1

| PIB Terminal Groups | Percent in Conventional PIB | Percent in High Vinylidene PIB |
|---|---|---|
| 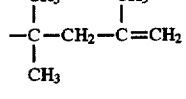<br>I  Vinylidene (α-olefin) | 4–5% | 50–90% |
| 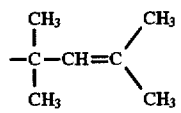<br>II  β-Isomer (of vinylidene) | | 6–35% |
| 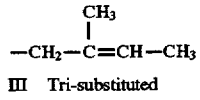<br>III  Tri-substituted | 63–67% | absent or minor |
| 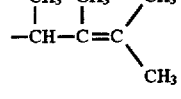<br>IV  Tetra-substituted | 22–28% | 1–15% |
| 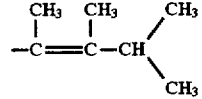<br>IVA 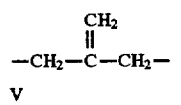<br>V | 5–8% | 0–4% |
| Other | 0–10% | 0–10% |

As can be seen from the structures in Table 1, conventional PIB is characterized by very low terminal vinylidene groups (I) and species capable of isomerization therewith (II). Conventional PIB further comprises a distinct tri-substituted terminal olefin group (III) which is nearly absent or present in only a low level in high vinylidene PIB. The distinct terminal group III is a 2-butene in which the 2-carbon is tri-substituted.

Structure IVA of Table 1 is an acid-catalyzed rearrangement product of IV while V is an internal vinylidene group. The terminal group content of conventional and high vinylidene PIBs have been determined by NMR, analysis. Conventional PIBs are commercially available under various tradenames including Parapol® from Exxon, Lubrizol® 3104, 3108 from Lubrizol and Indopol® from Amoco and Hyvis® from BP. Conventional PIBs have number average molecular weight in the range of 300–5000, but the preferred number average molecular weight is in the range of 500–2000.

Heteropolyacids and salts thereof have been used to react with olefins to form oligomeric structures. Hydrogenated phosphomolybdic catalysts have been reported to convert carbon monoxide to non-defined high molecular weight hydrocarbons. In this system reported in U.S. Pat. No.

2,825,704, phosphomolybdic acid and its ammonium salt are reduced under hydrogen atmosphere at atmospheric pressure and a temperature of at least 350° C. The catalyst so produced is then reacted with carbon monoxide in a hydrogen atmosphere at least 200 atmospheres pressure and 125° C. to 350° C.

U. S. Pat. No. 2,982,799 ('799) reports that at about 20°–200° C. isobutylene can be polymerized by use of a specially prepared heteropolyacid catalyst. The catalyst consisted of a heteropolyacid deposited on a solid carrier. The solid carrier had an alkali (including ammonium) content of less than one milliequivalent per 100 grams of carrier and a silico-tungstic acid concentration of 0.5–8% by weight of the total catalyst. The system resulted in oligomers up to $C_{16}$ from isobutylene, or a degree of polymerization (dp) of four. The temperature used was above 20° C. It was reported in the '799 patent that heteropolyacids and their salts are useful in polymerization of hydrocarbons but no reference or data was presented.

However, references cited in the '799 patent disclose dimer and trimer formation from low molecular weight olefins and heteropolyacids and salts thereof. For example, U.S. Pat. No. 2,237,460 ('460) discloses using heteropolyacid $Cr_2(SO_4)_3 \cdot xH_2SO_4 \cdot yH_2O$ to couple $C_3$–$C_5$ olefins to form dimers and trimers and non-defined higher polymers. The object of the '460 patent was to produce liquid fuels from gaseous olefins. The liquid fuels were to be in the boiling point range of gasoline.

U.S. Pat. No. 2,301,966 discloses the use of a wide variety of phosphotungstic acids to form dimers and trimers from isobutylene and to condense $C_9$ and $C_{10}$ olefins with aromatics.

Heteropolyacids in the presence of water were reported to dimerized α-methylstyrene in Japanese patent application JP07/242,573 (CA 123.339126j). At 100° C., $H_3PW_{12}O_{40}$ and water was reported to give 86.1% of α-methylstyrene dimer.

In Japanese patent application 08/012601 α-methylstyrene was reported to yield 83.1 weight percent oligomers when treated with phosphotungstic acid at 50° C. for one hour. Tetramers were reported to occur in 8.0 weight percent yield (dp=4) and pentamers and higher oligomers were reported to be 6.6 weight percent.

SUMMARY OF THE INVENTION

We have discovered that solid acid catalysts in the form of heteropolyacid full and partial salts will polymerize terminal olefins to yield polyolefins. The polyolefins may have the same reactive groups of terminal vinylidene units (I) and isomers in resonance therewith (II) in the same amounts as those reported in high vinylidene PIBs described above. In the context of this invention, PIB stands as a representative of all oligomers and polyolefins formed from $C_2$–$C_{30}$ olefins and derivatives thereof having a degree of polymerization (dp) of six or higher. The method of this invention provides polyolefins of dp up to about 350. This results in $\overline{Mn}$ of polyisobutylene between about roughly 300 and 20,000.

The reactive end group in the oligomers or polymers corresponds to structures (I) and (II) of Table 1. The reaction products preferably contain more than about 30% of combined amounts of terminal groups (I) and (II) and more preferably more than about 60% of the same groups.

DETAILED DESCRIPTION OF THE INVENTION

Heteropolyacid catalysts can exist as the free acid or as a salt of a heteropolyanion. Heteropolyanions are polymeric oxoanions formed by a condensation reaction of two or more different oxoanions, e.g.,

$$12WO_4^{2-} + HPO_4^{2-} + 23H^+ \rightarrow (PW_{12}O_{40})^{3-} + 12H_2O$$

A variety of structures are known for these materials; they can have, for instance, the so-called Keggin structure, wherein twelve $WO_6$ octahedra surround a central $PO_4$ tetrahedron (in the case where phosphorus is employed). Other structures and related formulas are also known, including $PW_{12}O_{42}$, $PW_{18}O_{62}$, $P_2W_5O_{23}$, $PW_9O_{32}$, $PW_6O_{24}$, $P_2W_{18}O_{62}$, $PW_{11}O_{39}$, and $P_2W_{17}O_{61}$, where P and W are taken as representative elements and the indicated structure is an ion with the appropriate charge. The central atom of the Keggin structure, which is typically phosphorus, as shown, can also be any of the Group IIIA to Group VIIA (ACS numbering) metalloids or non-transition metals, including P, As, Si, Ge, B, Al, Sb, and Te. The tungsten (W) in the above formula fills the role known as the "poly atom," which can be any of the Group VB or VIB transition metals, including W, V, Cr, Nb, Mo, or Ta. Thus suitable materials include preferably phosphomolybdates, phosphotungstates, silicomolybdates, and silicotungstates. Other combinations selected from among the above elements are also possible, including borotungstates, titanotungstates, stannotungstates, arsenomolybdates, telluromolbydates, aluminomolybdates, and phosphovanadyltungstates, the latter representing a mixed material having a formula (for the anion portion) of $PW_{11}VO_{40}$. The preferred material is a phosphotungstate, which term generally encompasses both the acid and the various salts, described below.

The heteropoly catalysts are active both as their acid form, in which the anion is associated with the corresponding number of hydrogen ions, in the fully salt form, in which the hydrogen ions have been replaced by other cations such as metal ions, or in the partially exchanged salt form, in which a portion of the hydrogen ions have been thus replaced. Thus the catalyst can be a partially or fully exchanged with cations from the elements in groups IA, IIA and IIIA of the periodic chart, Group IB–VIIB elements and Group VIII metals including manganese, iron, cobalt, nickel, copper, silver, zinc, boron, aluminum, bismuth, or ammonium or hydrocarbyl-substituted ammonium salt. Alkali metals include the metals in column IA of the periodic table, especially sodium, potassium, and cesium. Alkaline earth metals include metals in column IIA of the periodic table, especially magnesium, calcium, and barium. The exact stoichiometry of these materials will depend on the identity of the metals and metalloids employed in their structure. Thus a common and useful material in the acid form is $H_3PW_{12}O_{40}$. The corresponding material in the cesium salt form is $Cs_3PW_{12}O_{40}$; various partially exchanged forms, including specifically $Cs_{2.5}H_{0.5}PW_{12}O_{40}$, are also particularly useful in the present invention. In the latter material, 2.5 of the three original hydrogen ions are replaced by cesium ions. This is a relatively well defined material; the fractional coefficients of the Cs and the H indicate that an alternative empirical formula would be $Cs_5HP_2W_{24}O_{80}$, but the former expression is more commonly employed. The corresponding partial ammonium salt, $(NH_4)_{2.5}H_{0.5}PW_{12}O_{40}$, is also known and is effective, as is the aluminum salt, $Al_{0.83}H_{0.5}PW_{12}O_4$.

For more detailed information on the structures of heteropoly catalysts, attention is directed to Misono, "Heterogeneous Catalysis by Heteropoly Compounds of. Molybdenum and Tungsten," Catal. Rev.-Sci. Eng., 29(2&3), 269–321 (1987), in particular, pages 270–27 and 278–280.

Heteropoly acids are commercially available materials, (e.g., Aldrich Chemical Company, #22,420-0). The salts are similarly commercially available. Alternatively, they can be prepared from the acid materials by neutralization with an appropriate amount of base. For instance, the above-mentioned $Cs_{2.5}$ salt is prepared by neutralization of $H_3PW_{12}O_{40}$ with 2.5 equivalents of cesium hydroxide. The product is isolated by evaporation of the excess water.

Heteropoly acids are generally received in a hydrated form. They can be successfully employed in this form (uncalcined) or they can be treated (calcined) to remove some or all of the water of hydration, that is, to provide a dehydrated species, which sometimes exhibits improved reactivity. Calcining can be conducted by simply heating the hydrated material to a suitable temperature to drive off the desired amount of water. The heating can be under ambient pressure or reduced pressure, or it can be under a flow of air or an inert gas such as nitrogen. The calcining is preferably conducted in air at a temperature of at least 150° C., preferably at least 200° C., more preferably at least 250° C., for instance, up to 375° C. The air ensures that the acid is in a high oxidation state. The length of time required for calcining is related to the equipment and scale, but at the laboratory level the calcining is typically at least 30 minutes; preferably at least 1 hour, more preferably at least 2 hours or even 3 hours. The upper limits of temperature and time are defined largely by the economics of the process; temperatures much over 350° C. do not generally provide much advantage, nor do times in excess of about 5 hours.

The catalyst can be employed as particles of the pure acid or salt, or it can be provided on a solid support of an inert material such as alumina, silica/alumina, an aluminophosphate, a zeolite, carbon, clay, or, preferably, silica. The catalyst can be coated onto the support by well-known catalyst impregnation techniques, e.g., by applying the catalysts as a solution, followed by drying. If a support such as silica is employed, the ratio of the active catalyst component to the silica support will preferably be in the range of 0.5:99.5 to 50:50 by weight, preferably 3:97 to 40:60 by weight, and more preferably 10:90 to 30:70 by weight.

Certain supported heteropolyacid catalysts are prepared differently. Such catalysts include certain of the salts of a heteropolyacid and a metal salt or an ammonium salt, for which an insoluble heteropolyacid salt would precipitate immediately, in water, upon formation. In these cases mixtures of heteropolyacids and other metal salts (e.g., acidic metal salts) can be prepared which do not precipitate insoluble neutralization products upon mixing. The desired solid heteropolyacid salt can then be prepared by heating the intermediate material to remove water or other solvent, followed by calcination to remove volatile products of the anion. For example, mixtures of aqueous $H_3PW_{12}O_{40}$ and $Al(NO_3)_3$ or $B(OH)_3$ can be stable solutions. Such solutions, before drying and heat treatment, can be coated onto a support by conventional methods such as impregnation. After removal of water, heat treatment of the metal-heteropolyacid on the support liberates oxide(s) of nitrogen and leads to an insoluble active catalyst, uniformly coated on the support. Repeated treatment and drying cycles can be used to increase the catalyst loading.

The temperatures used in this invention in the polymerization of olefins is preferably below 20° C. and more preferably below 10° C. The preferred products are polyisobutylenes having $\overline{Mn}$ greater than about 300. For the $C_4$ isobutylene, this would correspond to an average degree of polymerization (dp) of about 5.3. The preferred $\overline{Mn}$ of polyisobutylene ranges from about 1000–2000 when used in reactions to alkylate maleic anhydride. As well as iobutylenes, other $C_2$-$C_3$-olefins and derivatives thereof may be used in this invention as well as styrene and derivatives thereof, conjugated dienes such as butadiene and isoprene and non-conjugated polyenes. The reaction to produce polymers may be run with mixtures of starting olefins to form copolymers. The mole ratio of olefin substrate to catalyst in this invention ranges from 1,000:1 to 100,000 to 1.

The polymers produced by the process of this invention are derived from $C_2$-$C_{30}$ olefin monomers and mixtures thereof and derivatives thereof. Under this terminology, styrene and derivatives would be a $C_2$-olefin substituted by a phenyl group.

Useful olefin monomers from which the polyolefins of this invention can be derived are polymerizable olefin in monomers characterized by the presence of one or more unsaturated double bonds (i.e., >C=C<); that is, they are monoolefinic monomers such as ethylene, propylene, butene-1, isobutylene, and octene-1 or polyolefinic monomers (urnally diolefinic monomers) such as butadiene-1,3 and isoprene.

These olefin monomers are preferably polymerizable terminal olefins; that is, olefins characterized by the presence in their structure of the group —R'—CH=CH2, where R' is H or a hydrocarbyl group. However, polymerizable internal olefin monomers (sometimes referred to in the patent literature as medial olefins) characterized by the presence within their structure of the group:

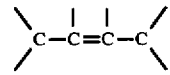

can also be used to form the polyalkenes. When internal olefin monomers are employed, they normally will be employed with terminal olefins to produce polyalkenes which are interpolymers. For purposes of this invention, when a particular polymerized olefin monomer can be classified as both a terminal olefin and an internal olefin, it will be deemed to be a terminal olefin. Thus, for example, pentadiene-1,3 (i.e., piperylene) is deemed to be a terminal olefin for purposes of this invention.

While the polyalkenes of this invention generally are hydrocarbon polyalkenes, they can contain substituted hydrocarbon groups such as lower alkoxy, and carbonyl, provided the non-hydrocarbon moieties do not substantially interfere with the functionalization reactions of this invention. Preferably, such substituted hydrocarbon groups normally will not contribute more than about 10% by weight of the total weight of the polyalkenes. Since the polyalkene can contain such non-hydrocarbon substituents, it is apparent that the olefin monomers from which the polyalkenes are made can also contain such substituents. Normally, however, as a matter of practicality and expense, the olefin monomers and the polyalkenes will be flee from non-hydrocarbon groups-(as used herein, the term "lower" when used with a chemical group such as in "lower alkyl" or "lower alkoxy" is intended to describe groups having up to seven carbon atoms.)

Although the polyalkenes of this invention may include aromatic groups (especially phenyl groups and lower alkyl-and/or lower alkoxy-substituted phenyl groups such as para-(tert-butyl)phenyl) and cycloaliphatic groups such as would be obtained from polyrnerizable cyclic olefins or cycloaliphatic substituted-polymerizable acrylic olefins, the polyalkenes usually will be free from such groups. Again, because aromatic and cycloaliphatic groups can be present, the olefin monomers from which the polyalkenes are prepared can contain aromatic and cycloaliphatic groups.

There is a general preference for polyalkenes which are derived from the group consisting of homopolymers and interpolymers of terminal hydrogen olefins of 2 to about 16 carbon atoms. A more preferred class of polyalkenes are those selected from the group consisting of homopolymers and interpolymers of terminal olefins of 2 to about 6 carbon atoms, more preferably 2 to 4 carbon atoms.

Specific examples of terminal and internal olefin monomers which can be used to prepare the polyalkenes of this invention include propylene; butene-1; butene-2; isobutylene; pentene-1; hexene-1; heptene-1; octene-1; nonene-1; decene-1; pentene-2; propylene-tetramer; diisobutylene; isobutylene trimer; butadiene-1,2; butadiene-1,3; pentadiene-1,2; pentadiene-1,3; isoprene; hexadiene-1,5; 2-chloro-butadiene-1,2; 2-methyl-heptene-1; 3-cyclohexylbutene-1; 2-methyl-5-propyl-hexene-1; pentene-3; octene-4; 3,3-dimethyl-pentene-1; styrene; 2,4-dichlorostyrene; divinylbenzene; vinyl acetate; allyl alcohol; 1-methyl-vinyl acetate; acrylonitrile; ethyl acrylate; methyl methacrylate; ethyl vinyl ether; and methyl vinyl ketone. Of these, the hydrocarbon polymerizable monomers are preferred and of these hydrocarbon monomers, the terminal olefin monomers are particularly preferred.

Useful polymers formed in this invention include alpha-olefin homopolymers and interpolymers, and ethylene/alpha-olefin copolymers and terpolymers. Specific examples of polyalkenes include polypropylene, polybutene, ethylene-propylene copolymer, ethylene-butene copolymer, propylene-butene copolymer, styrene-isobutylene copolymer, isobutylene-butadiene-1,3 copolymer, propene-isoprene copolymer, isobutylenechloroprene copolymer, isobutylene-(para-methyl)styrene copolymer, copolymer of hexene-1 with hexadiene-1,3, copolymer of octene-1, copolymer of 3,3-dimethyl-pentene-1 with hexene-1, and terpolymer of isobutylene, styrene and piperylene. More specific examples of such interpolymers include copolymer of 95% (by weight) of isobutylene with 5% (by weight) of styrene; terpolymer of 98% of isobutylene with 1% of piperylene and 1% of chloroprene; terpolymer of 95% of isobutylene with 2% of butene-1 and 3% of hexene-1; terpolymer of 60% of isobutylene with 20% of pentene-1; and 20% of octene-1; terpolymer of 90% of isobutylene with 2% of cyclohexene and 8% of propylene; and copolymer of 80% of ethylene and 20% of propylene. U.S. Pat. No. 5,334,775 describes polyolefin based polymers of many types and their monomer precursors and is herein incorporated by reference for such disclosure.

Example 1. In a batchwise synthesis of polyisobutylene (PIB) 59 grams (100 ml, 1.05 mole) of isobutene was reacted in cyclohexane with 0.40 grams (0.000125 mole) calcined $Cs_{2.5}H_{0.5}PW_{12}O_{40}$ in the following manner.

In a fume hood, a four-necked round bottom flask under nitrogen was charged with 100 ml cyclohexane solvent and the catalyst. The flask was fitted with a cold finger, thermometer, nitrogen inlet and jacketed addition funnel. The solvent and catalyst were stirred under $N_2$ for thirty minutes. Isobutene was then condensed in the jacketed addition funnel and added to the mixture which was kept at about 8° C. for thirty minutes with stirring. Methanol was then added to quench the reaction and volatiles were removed at reduced pressure at 150° C. after separation from the catalyst. This procedure produced 25 grams PIB. The polyolefin product had a $\overline{Mn}$ of about 2300, $\overline{Mw}/\overline{Mn}$ ratio of about 4.7 and a terminal vinylidene content (I) of 77%. The content of isomers II and III combined were about 22%.

Example 2. In a similar experiment, the isobutene was added to the cyclohexane at an initial temperature of −10° C. The temperature quickly rose to 3° C. and was then maintained at 8° C. and methanol quenched. This produced about 60% yield of polyisobutylene having 75% vinylidene end groups (I) and 21% combined β-isomer (II) and tri-substituted isomer (III). The polymer had $\overline{Mn}$ 1584, $\overline{Mw}/\overline{Mn}$ ratio of 3.86.

Example 3. In an experiment conducted with the same equipment and detail as recited in Examples 1 and 2 above, a nitrogen atmosphere was established in the flask and 100 ml cyclohexane was added. After 30 minutes stirring under $N_2$ 0.1 gram $(NH_4)_{2.5}H_{0.5}PW_{12}O_{40}$ was added. Isobutylene (59 grams, 1.05 moles) was condensed into the addition funnel and added to the stirred reaction flask. After 30 minutes, methanol was added to quench the reaction. This produced about 49% yield of polymer of $\overline{Mn}$ 1328, $\overline{Mw}/\overline{Mn}$ ratio of 11.13. The isomer distribution was 24% vinylidene (I), and 50% combined β-isomer (II) and tri-substituted (III).

Example 4. It is also possible to use a continuous polymerization system with the heteropoly acid catalyzed polymerization of α-olefins. An example of this is discussed herein. The apparatus used in this experiment has a two-necked collection flask, two pressure equalized jacketed addition funnels, a cold finger, a nitrogen inlet. The reaction is run under nitrogen conditions. In this experiment, 8 grams of sand was added to one addition funnel together with 0.5 grams of calcined $Cs_{2.5}H_{0.5}PW_{12}O_{40}$. 176 grams, 3.14 moles isobutene was condensed in the second jacketed pressure equalizing funnel by means of the cold finger. Liquid isobutene was added to the addition flask with the catalyst and then allowed to drip through the catalyst/sand bed into the collection flask. The catalyst bed was always covered with liquid during the reaction. After four hours, the material in the collection vessel was washed with water and vacuum stripped. This gave a roughly 50% yield of polybutylene with $\overline{Mn}$ 2452, $\overline{Mw}/\overline{Mn}$ 6.35, 64% terminal vinylidene groups (I), and 17% combined tri (III) and β-isomers(II).

Relative amounts of end units in conventional and high vinylidene polyisobutylenes were determined from NMR spectra made using a Burker AMX 300 or 500 instrument and UXNMRP software to work up the spectra. The spectra were determined at 300 or 500 MHz in $CDCl_3$. Band assignments in the NMR for the various isomers as parts per million (ppm) down field shift from tetramethyl silane are: terminal vinylidene 4.68 and 4.89, β-isomer 5.18, tri-substituted 5.17 and 5.35, tetra 2.88.

The molecular weight of the isomers were typically determined by GPC on a Waters 150 instrument run with tetrahydrofuran solvent. The columns were Waters ultra-styrogel of pore size $10^4$ Å, $10^3$ Å, 500 Å, and 300 Å which had been calibrated with PIB standards. Styrene molecular weight standards are also useful. $\overline{Mn}$ and $\overline{Mw}$ were determined from comparative elution volume data. Molecular weight values of the polymers produced by the method of this invention will vary according to their degree of polymerization. The dp range for products of this invention range from about 6 to 350 or even higher.

The polydispersity of the products of this invention as determined by the ratio of $\overline{Mw}/\overline{Mn}$ preferably has a value of 1.5 to 2.0 but may range up to 11 depending upon reaction conditions. At any given reaction temperature, the $\overline{Mw}/\overline{Mn}$ is controlled by the contact time of the olefin with the catalyst and the concentration of the olefin during the reaction.

What is claimed is:

1. A method for producing polymers by polymerization of olefins, the method comprising:

contacting a $C_2$–$C_{30}$ olefin of formula R'—C(R")↑$CH_2$ where R' is H or hydrocarbyl and R" is H or methyl with a partially or fully neutralized heteropolyacid to produce said polymer, said polymer having a degree of polymerization (dp) of at least 6.

2. The method according to claim 1, wherein said partially or fully neutralized heteropolyacid is a phosphotungstic acid, silicotungstic acid, phosphomolydic acid or silicomolybdic acid.

3. The method according to claims 1 or 2, wherein said partially or fully neutralized heteropoly acid contains cations from groups 1A; 2A; and 3A of the periodic chart.

4. The method according to claim 1 or 2, wherein said partially or fully neutralized heteropolyacid contains cations $Cs^+$, $Mg^{2+}$, $NH_4^+$ or $Zn^{+2}$ or mixtures thereof.

5. The method according to claim 1 or 2, wherein the combined terminal vinylidene (I) and β-isomer (II) content of said polymer is at least 30%.

6. The method according to claim 1 or 2, wherein the combined terminal vinylidene (I) and β-isomer (II) content of said polymer is at least 60%.

7. The method according to claim 1 or 2, wherein said olefin is isobutylene and said polymer is $\overline{Mn}$ 300–20,000 polyisobutylene.

8. The method according to claim 1 or 2, wherein said partially or fully neutralized heteropoly add is calcined prior to contacting said olefin.

9. A method according to claim 2, wherein said phosphotungstic acid is $Cs_{2.5}H_{0.5}PW_{12}O_{40}$.

10. The method according to claim 1 or 2, wherein said partially or fully neutralized heteropolyaeid is a supported heteropolyacid.

* * * * *

UNITED STATES PATENT AND TRADEMARK OFFICE
CERTIFICATE OF CORRECTION

PATENT NO.: 5,710,225
DATED: January 20, 1998
INVENTOR(S): John R. Johnson and James D. Burrington It is certified that error appears in the above-identified patent and that said Letters Patent is hereby corrected as shown below:

In column 9, line 4, correct the formula R'—C(R")↑CH$_2$ to read R'—C(R")=CH$_2$.

Signed and Sealed this

Twentieth Day of April, 1999

Attest:

Q. TODD DICKINSON

Attesting Officer

Acting Commissioner of Patents and Trademarks